(12) United States Patent
Miyamoto et al.

(10) Patent No.: US 9,445,004 B2
(45) Date of Patent: *Sep. 13, 2016

(54) IMAGE CAPTURING APPARATUS CAPABLE OF CAPTURING PANORAMIC IMAGE

(71) Applicant: CASIO COMPUTER CO., LTD., Shibuya-ku, Tokyo (JP)

(72) Inventors: Naotomo Miyamoto, Tokyo (JP); Kosuke Matsumoto, Tokyo (JP); Kazuhisa Matsunaga, Tokyo (JP); Nobuyoshi Nishizaka, Tokyo (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/816,897

(22) Filed: Aug. 3, 2015

(65) Prior Publication Data

US 2015/0341556 A1 Nov. 26, 2015

Related U.S. Application Data

(63) Continuation of application No. 14/601,991, filed on Jan. 21, 2015, now Pat. No. 9,106,831, which is a continuation of application No. 13/243,387, filed on Sep. 23, 2011, now Pat. No. 8,957,945.

(30) Foreign Application Priority Data

Sep. 24, 2010 (JP) ................................. 2010-213657

(51) Int. Cl.
*H04N 5/00* (2011.01)
*H04N 5/232* (2006.01)
(Continued)

(52) U.S. Cl.
CPC .......... *H04N 5/23238* (2013.01); *G03B 35/00* (2013.01); *H04N 5/23245* (2013.01); *H04N 5/2625* (2013.01)

(58) Field of Classification Search
CPC ... G06T 2200/32; G06T 3/4038; G06T 3/40; H04N 5/00
USPC .......................................................... 348/46
See application file for complete search history.

(56) References Cited

U.S. PATENT DOCUMENTS

2005/0237631 A1  10/2005  Shioya et al.
2005/0264650 A1  12/2005  Park et al.
(Continued)

FOREIGN PATENT DOCUMENTS

JP    06303562 A    10/1994
JP    11018003 A    1/1999
(Continued)

OTHER PUBLICATIONS

Japanese Office Action dated Dec. 4, 2012 issued in counterpart Japanese Application No. 2010-213657.
(Continued)

*Primary Examiner* — Jeffery Williams
(74) *Attorney, Agent, or Firm* — Holtz, Holtz & Volek PC

(57) ABSTRACT

A digital camera includes an image capturing unit, an image composition unit, and a display control unit. The image capturing unit captures frames at predetermined time intervals. The image composition unit sequentially combines at least a part of image data from image data of a plurality of frames sequentially captured by the image capturing unit at predetermined time intervals. The display control unit performs control to sequentially display image data combined by the image composition unit while the image data of the frames are captured by the image capturing unit at predetermined time intervals.

28 Claims, 8 Drawing Sheets

(51) Int. Cl.
*G03B 35/00* (2006.01)
*H04N 5/262* (2006.01)

(56) References Cited

U.S. PATENT DOCUMENTS

| | | |
|---|---|---|
| 2007/0025723 A1 | 2/2007 | Baudisch et al. |
| 2007/0172151 A1 | 7/2007 | Gennetten et al. |
| 2010/0149358 A1 | 6/2010 | Shioya et al. |

FOREIGN PATENT DOCUMENTS

| | | |
|---|---|---|
| JP | 11196311 A | 7/1999 |
| JP | 2000324380 A | 11/2000 |
| JP | 2003037838 A | 2/2003 |
| JP | 2005184533 A | 7/2005 |
| JP | 2005348448 A | 12/2005 |
| JP | 2008098754 A | 4/2008 |
| JP | 2009171110 A | 7/2009 |
| JP | 2009253717 A | 10/2009 |
| JP | 2009278351 A | 11/2009 |
| JP | 2009284522 A | 12/2009 |
| WO | 2008087721 A1 | 7/2008 |

OTHER PUBLICATIONS

Japanese Office Action dated Jan. 29, 2013 issued in counterpart Japanese Application No. 2010-213657.
Japanese Office Action dated Jan. 7, 2014 issued in counterpart Japanese Application No. 2010-213657.
Japanese Office Action dated Jun. 3, 2014 in counterpart Japanese Application No. 2013-093583.

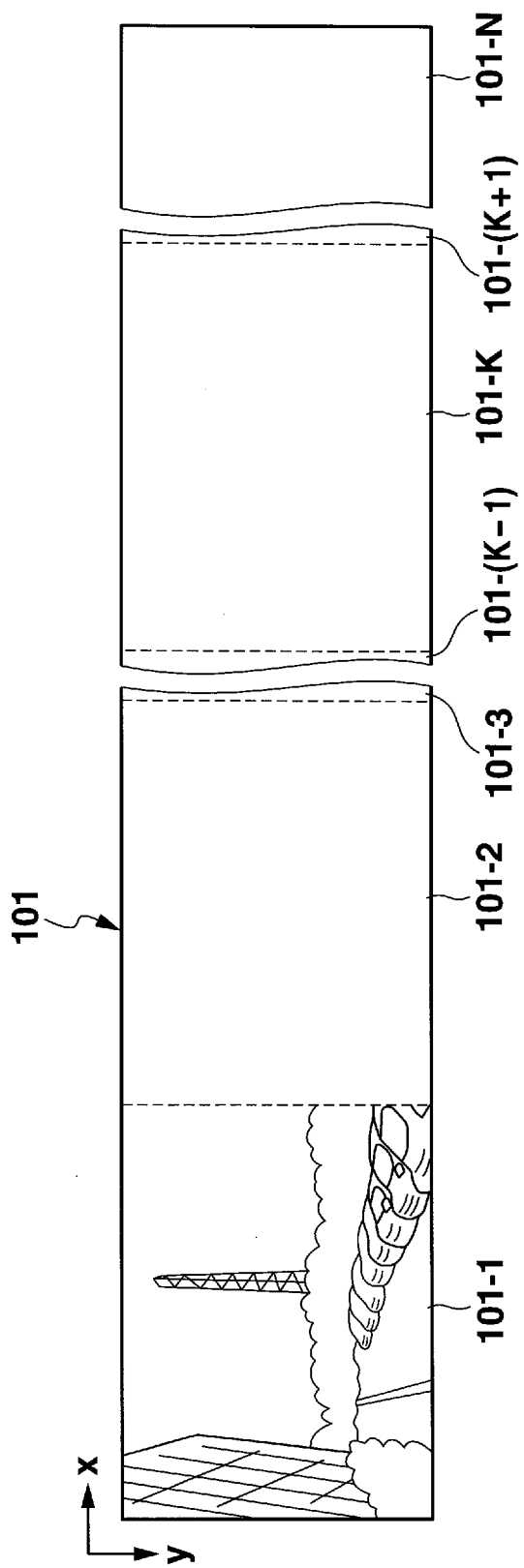

IMAGE CAPTURING APPARATUS CAPABLE OF CAPTURING PANORAMIC IMAGE

This application is a Continuation application of U.S. application Ser. No. 14/601,991, filed Jan. 21, 2015, which is a Continuation application of U.S. application Ser. No. 13/243,387, now U.S. Pat. No. 8,957,945, filed Sep. 23, 2011 and is based upon and claims the benefit of priority from the prior Japanese Patent Application No. 2010-213657, filed Sep. 24, 2010. The entire contents of all of the above-identified applications are incorporated herein by reference.

BACKGROUND OF THE INVENTION

1. Field of the Invention

The present invention relates to an image capturing apparatus, an image displaying method, and a storage medium, and more particularly to an image capturing apparatus capable of capturing a panoramic image, an image displaying method, and a storage medium having stored therein a program.

2. Related Art

A panoramic image capture function has been conventionally provided as a function of an image capturing apparatus.

The panoramic image capture function is a function of generating image data of a panoramic image by allowing a digital camera to perform image capturing a plurality of times while the digital camera is moved in a horizontal direction in a state in which a user continuously presses down a shutter button thereof, and combining data of the plurality of images thus acquired as a result of image capturing, in a landscape (horizontal) orientation.

Japanese Patent Application Publication No. 1994-303562 discloses a technique in which a digital camera displays a landscape-oriented box superimposed on an image currently being captured and presents the progress of panoramic image capturing by use of a horizontal bar stretching along a landscape orientation within the landscape-oriented box.

SUMMARY OF THE INVENTION

However, when capturing a panoramic image using the technique of the above-described patent document, a user cannot confirm the history of captured images, e.g., as to what kinds of images have been captured from the start of the panoramic image capturing until the present.

Therefore, there may be a case in which it turns out that a necessary image is missing or, conversely, that an unnecessary image is captured after the panoramic image capturing is ended. In such a case, the user has to repeat the image capture operation many times in order to acquire a desired panoramic image.

The present invention is conceived in view of the above-described circumstances, and it is an object of the present invention to enable a user to easily view and recognize the history of so far captured images while a panoramic image is being captured.

In order to attain the above-described object, in accordance with a first aspect of the present invention, there is provided an image capturing apparatus, comprising: an image capturing unit that capture frames at predetermined time intervals, an image composition unit that sequentially combines at least a part of image data from image data of a plurality of frames sequentially captured by the image capturing unit at predetermined time intervals; and a display control unit that performs control to sequentially display image data combined by the image composition unit while the image data of the frames are captured by the image capturing unit at the predetermined time intervals.

In order to attain the above-described object, in accordance with a second aspect of the present invention, there is provided an image displaying method performed by an image capturing apparatus provided with an image capturing unit that captures frames at predetermined time intervals, the image displaying method comprising: an image composition step of sequentially combining at least a part of image data from image data of a plurality of the frames captured by the image capturing unit at predetermined time intervals; and a display control unit step of performing control to sequentially display image data combined in the image composition step while the image data of the frames are being captured by the image capturing unit at predetermined time intervals.

In order to attain the above-described object, in accordance with a third aspect of the present invention, there is provided a storage medium of a computer in an image capturing apparatus provided with an image capturing unit that capture frames at predetermined time intervals, the storage medium having stored therein a program to make the computer function as: an image composition unit that sequentially combines at least a part of image data from image data of a plurality of frames sequentially captured by the image capturing unit at predetermined time intervals; and a display control unit that performs control to sequentially display image data combined by the image composition unit while the image data of the frames are being captured by the image capturing unit at predetermined time intervals.

BRIEF DESCRIPTION OF THE DRAWINGS

FIG. 6 is a diagram illustrating image composition processing of the image processing unit shown in FIG. 2;

DETAILED DESCRIPTION OF THE INVENTION

The following describes an embodiment of the present invention with reference to the drawings.

Figure 1:
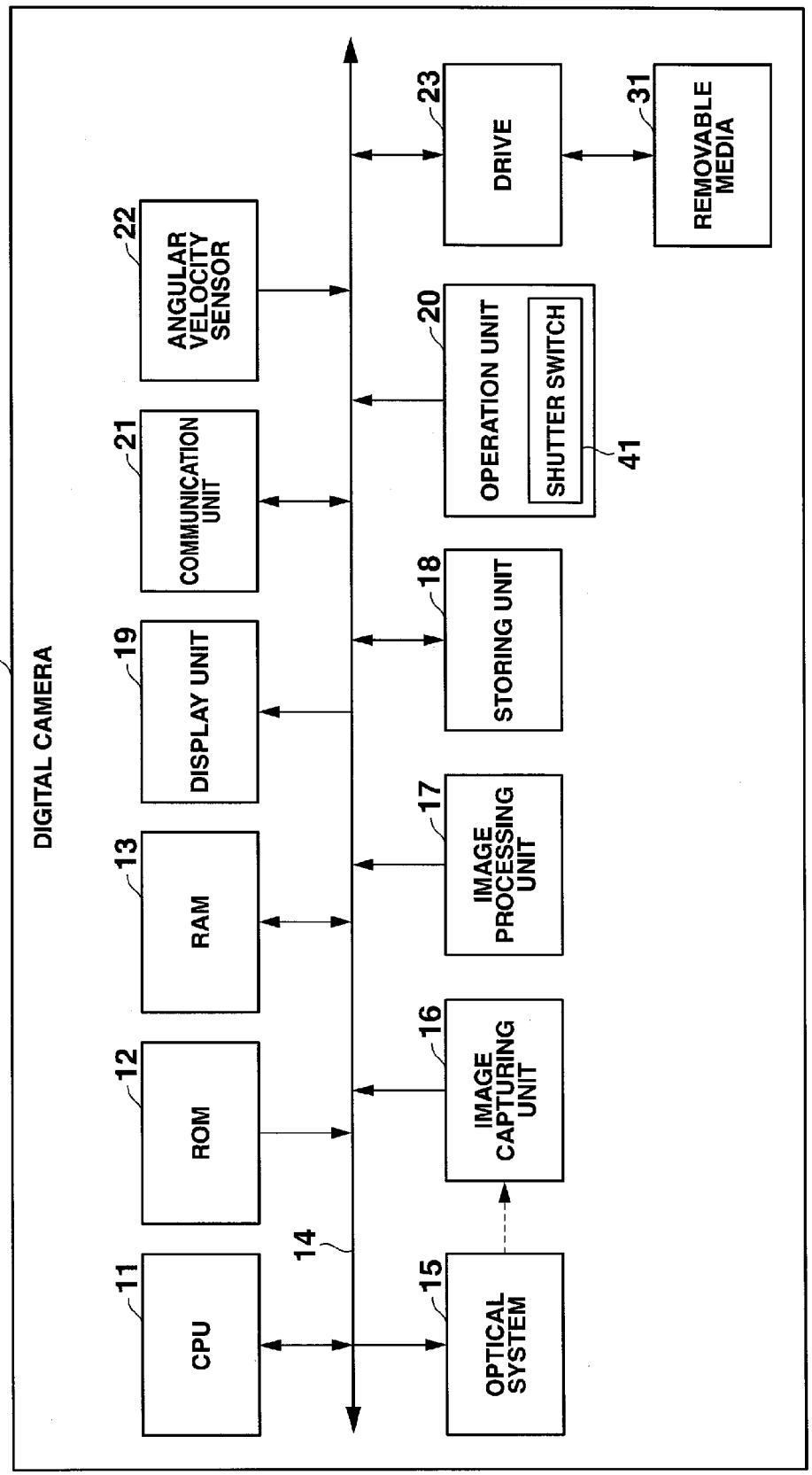
FIG. 1 is a block diagram showing a hardware configuration of a digital camera as one embodiment of an image capturing apparatus according to the present invention.

FIG. 1 is a block diagram showing a hardware configuration of a digital camera 1 as one embodiment of an image capturing apparatus according to the present invention.

The digital camera 1 is provided with a CPU (Central Processing Unit) 11, a ROM (Read Only Memory) 12, a RAM (Random Access Memory) 13, a bus 14, an optical system 15, an image capturing unit 16, an image processing unit 17, a storing unit 18, a display unit 19, an operation unit 20, a communication unit 21, an angular velocity sensor 22, and a drive 23.

The CPU 11 executes various processes according to programs that are stored in the ROM 12 or programs that are loaded from the storing unit 18 to the RAM 13.

The ROM 12 also stores data and the like, necessary for the CPU 11 to execute the various processes, as appropriate.

For example, according to the present embodiment, programs for implementing functions of an image capture control unit 51, an image composition unit 52, an image reduction unit 53, and a display control unit 54 shown in FIG. 2, which will be described later, are stored in the ROM 12 or the storing unit 18. Therefore, each of the functions of the image capture control unit 51, the image composition unit 52, the image reduction unit 53, and the display control unit 54 shown in FIG. 2, which will be described later, can be realized by the CPU 11 executing the processes according to these programs.

Incidentally, it is possible to transfer at least a part of each function of the image capture control unit 51, the image composition unit 52, the image reduction unit 53, and the display control unit 54 shown in FIG. 2, which will be described later, to the image processing unit 17.

The CPU 11, the ROM 12, and the RAM 13 are connected to one another via the bus 14. The bus 14 is also connected with the optical system 15, the image capturing unit 16, the image processing unit 17, the storing unit 18, the display unit 19, the operation unit 20, the communication unit 21, the angular velocity sensor 22, and the drive 23.

The optical system 15 is configured by a light condensing lens such as a focus lens, a zoom lens, and the like, for example, to photograph a subject. The focus lens is a lens for forming an image of a subject on the light receiving surface of the image sensor of the image capturing unit 16. The zoom lens is a lens for freely changing a focal point within a predetermined range. The optical system 15 is also provided with peripheral circuits to adjust focus, exposure, and the like, as necessary.

The image capturing unit 16 is configured by an optoelectronic conversion device, an AFE (Analog Front End), and the like. The optoelectronic conversion device is configured by a CCD (Charge Coupled Device) type or a CMOS (Complementary Metal Oxide Semiconductor) type optoelectronic conversion device, for example. The optoelectronic conversion device optoelectronically converts (i.e., captures), at a predetermined interval, a light signal of an image of a subject, which has been incident and accumulated during the interval, and sequentially supplies the resultant analog signal to the AFE.

The AFE executes various kinds of signal processing such as A/D (Analog/Digital) conversion on the analog signal and outputs the resultant digital signal as an output signal from the image capturing unit 16.

Hereinafter, the output signal from the image capturing unit 16 is referred to as "image data of a captured image". Thus, image data of a captured image is outputted from the image capturing unit 16 and provided as appropriate to the image processing unit 17 and the like.

The image processing unit 17 is configured by a DSP (Digital Signal Processor), a VRAM (Video Random Access Memory), and the like.

The image processing unit 17 collaborates with the CPU 11 to execute various kinds of image processing such as noise reduction, white balance, anti-shaking, and the like on image data of a captured image inputted from the image capturing unit 16 at a predetermined interval.

Hereinafter, image data of each captured image inputted from the image capturing unit 16 at a predetermined interval is referred to as "image data of a frame". In the present embodiment, such a frame is employed as a unit of processing. That is, the image processing unit 17 carries out various kinds of image processing on image data of a frame provided from the image capturing unit 16 and outputs the resultant image data.

The storing unit 18 is configured by a DRAM (Dynamic Random Access Memory) and the like and temporarily stores image data of a frame outputted from the image processing unit 17, image data of a panoramic image in progress, which will be described later, and the like. Also, the storing unit 18 stores various kinds of data necessary for various kinds of image processing.

The display unit 19 is configured as a flat display panel, for example, including an LCD (Liquid Crystal Device), an LCD driving unit, and the like. The display unit 19 displays an image represented by image data provided from the storing unit 18 or the like, e.g., a live-view image that will be described later, as a frame unit.

The operation unit 20 includes a plurality of switches, as well as a shutter switch 41, such as a power switch, an image capture mode switch, and a playback switch, which are not illustrated. When one of the plurality of switches is pressed, the operation unit 20 provides to the CPU 11 an instruction assigned to the switch.

The communication unit 21 controls communication with other devices (not shown) via a network including the Internet.

The angular velocity sensor 22 includes a gyro or the like, detects a value of angular displacement of the digital camera 1, and provides to the CPU 11 the digital signal (hereinafter, referred to simply as "angular displacement") indicating the detection result. Here, the angular velocity sensor 22 is assumed to have a function of detecting the direction of the geomagnetic field and thereby to implement a function of direction sensor, as necessary.

To the drive 23, removable media 31 such as a magnetic disk, an optical disk, a magneto-optical disk, or a semiconductor memory is mounted as appropriate. Also, programs read from the removable media 31 are installed in the storing unit 18 as necessary. Furthermore, similar to the storing unit 18, the removable media 31 can store various kinds of data such as image data and the like stored in the storing unit 18.

Figure 2:
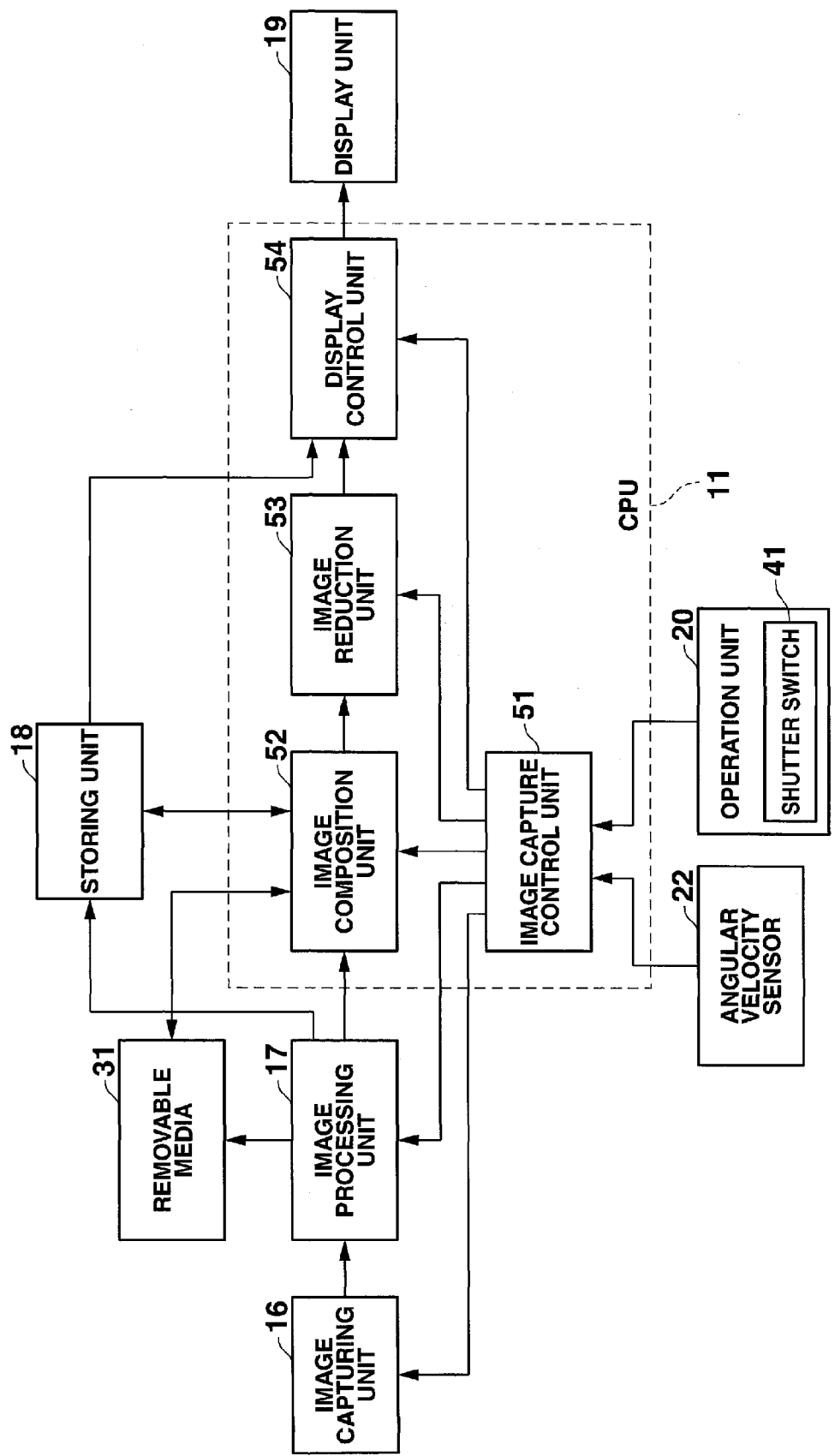
FIG. 2 is a functional block diagram showing a functional configuration for the digital camera shown in FIG. 1 to carry out image capture processing.

FIG. 2 is a functional block diagram showing a functional configuration to carry out a series of processing (hereinafter, referred to as "image capture processing") up to storing captured image data of a subject in the removable media 31 from among the processing carried out by the digital camera 1 shown in FIG. 1.

The CPU 11 is provided with an image capture control unit 51 that controls the execution of the image capture processing.

The image capture control unit 51 can, for example, selectively switch an operation mode of the digital camera 1 between a normal image capture mode and a panoramic image capture mode and can execute the processing according to the operation mode after switching.

Figure 3A:
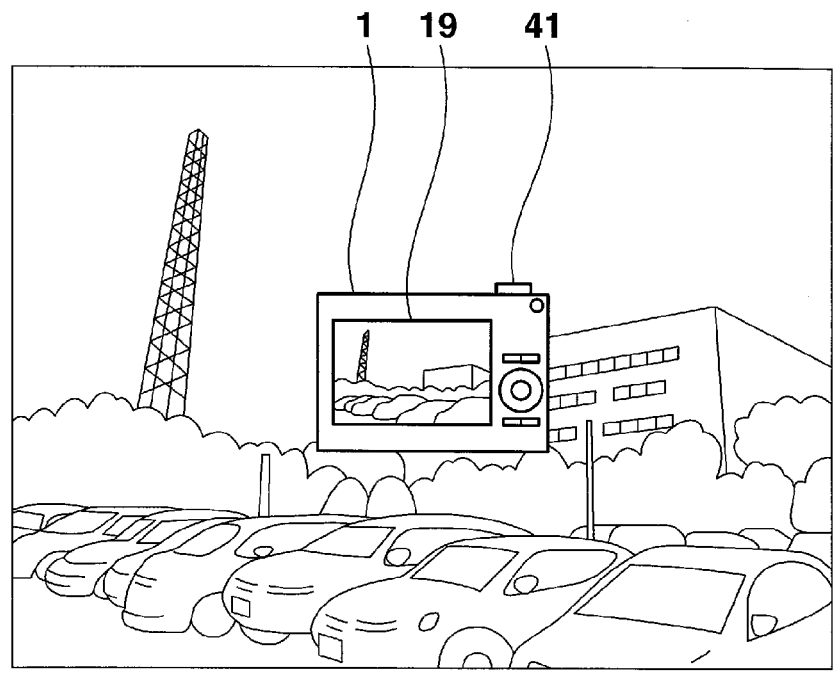
FIGS. 3A and 3B are diagrams illustrating image capture operations in cases in which a normal image capture mode and a panoramic image capture mode are respectively selected as an operation mode of the digital camera shown in FIG. 1.
Figure 3B:
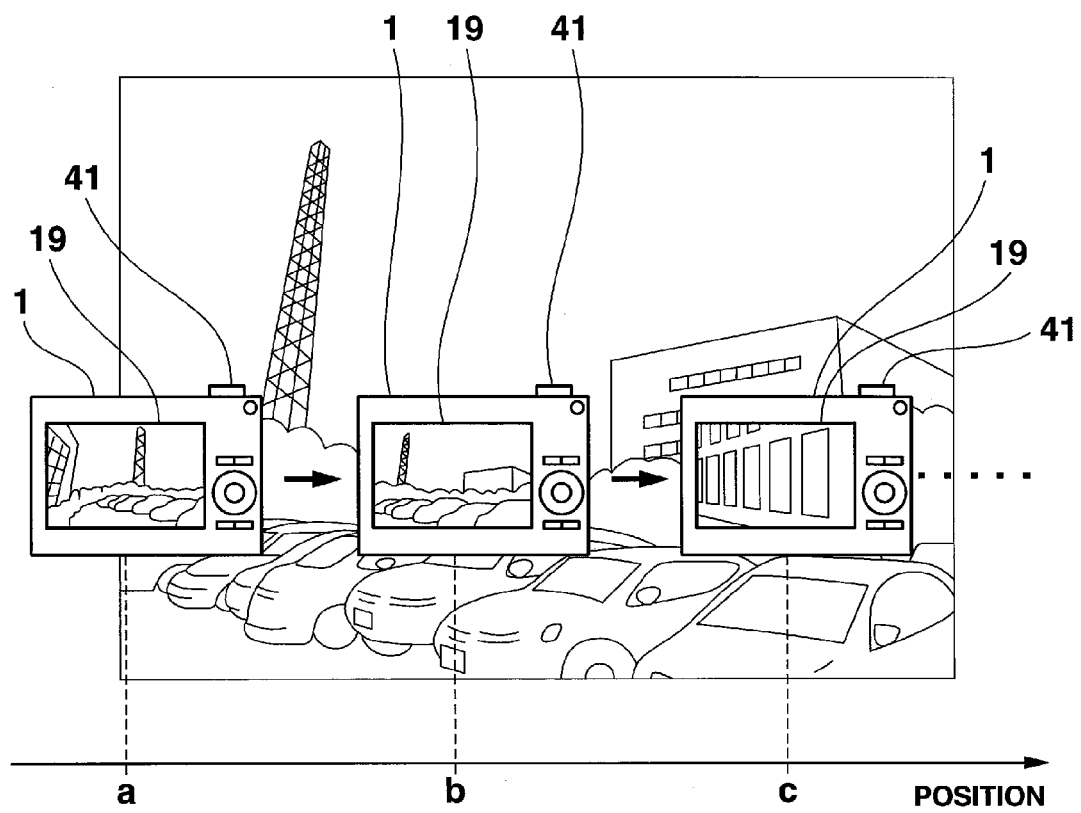

FIGS. 3A and 3B are diagrams illustrating image capture operations in cases in which the normal image capture mode and the panoramic image capture mode are respectively selected as the operation mode of the digital camera 1 shown in FIG. 1.

More specifically, FIG. 3A is a diagram illustrating the image capture operation in the normal image capture mode. FIG. 3B is a diagram illustrating the image capture operation in the panoramic image capture mode.

In each of FIGS. 3A and 3B, the picture in the back of the digital camera 1 shows a real world view including the imaging target of the digital camera 1. The vertical dotted lines shown in FIG. 3B indicate positions a, b, and c in the moving direction of the digital camera 1. Here, the moving direction of the digital camera 1 is intended to mean a direction in which an optical axis of the digital camera 1 moves when the user pivots about his/her own body to change the shooting direction (angle) of the digital camera 1.

The normal image capture mode is intended to mean an operation mode in which an image of a size (resolution) corresponding to the field of view of the digital camera 1 is captured.

In the normal image capture mode, as shown in FIG. 3A, the user presses the shutter switch 41 of the operation unit 20 all the way down while fixedly holding the digital camera 1. Hereinafter, such an operation of pressing the shutter switch 41 all the way down is referred to as "full press operation" or simply "full press".

The image capture control unit 51 controls execution of a series of processes up to a process of storing in the removable media 31, as a target to be recorded, image data of a frame outputted from the image processing unit 17 immediately after the user's full press operation.

Hereinafter, such a series of processes carried out under control of the image capture control unit 51 in the normal image capture mode is referred to as "normal image capture processing".

On the other hand, the panoramic image capture mode is intended to mean an operation mode in which a panoramic image is captured.

In the panoramic image capture mode, as shown in FIG. 3B, the user moves the digital camera 1 in a direction of black arrows shown therein, while continuing the full press operation of the shutter switch 41.

While the full press operation is continued, the image capture control unit 51 controls the image composition unit 52 to repeat temporarily storing in the storing unit 18 image data of a frame outputted from the image processing unit 17 immediately after each time angular displacement cumulatively provided from the angular velocity sensor 22 reaches a constant value.

After that, the user gives an instruction for termination of the panoramic image capturing by an operation of releasing the full press operation (hereinafter, referred to as "release operation"), i.e., moving a finger or the like away from the shutter switch 41.

When instructed to terminate the panoramic image capturing, the image capture control unit 51 generates image data of a panoramic image by horizontally combining image data of the plurality of frames so far stored in the storing unit 18 in the stored order.

The image capture control unit 51 then stores the image data of the panoramic image in the removable media 31 as a target to be recorded.

Thus, in the panoramic image capture mode, the image capture control unit 51 controls a series of processing from generating image data of a panoramic image up to storing it in the removable media 31 as a target to be recorded.

Hereinafter, such a series of processing in the panoramic image capture mode carried out under control of the image capture control unit 51 is referred to as "panoramic image capture processing".

Figure 4:
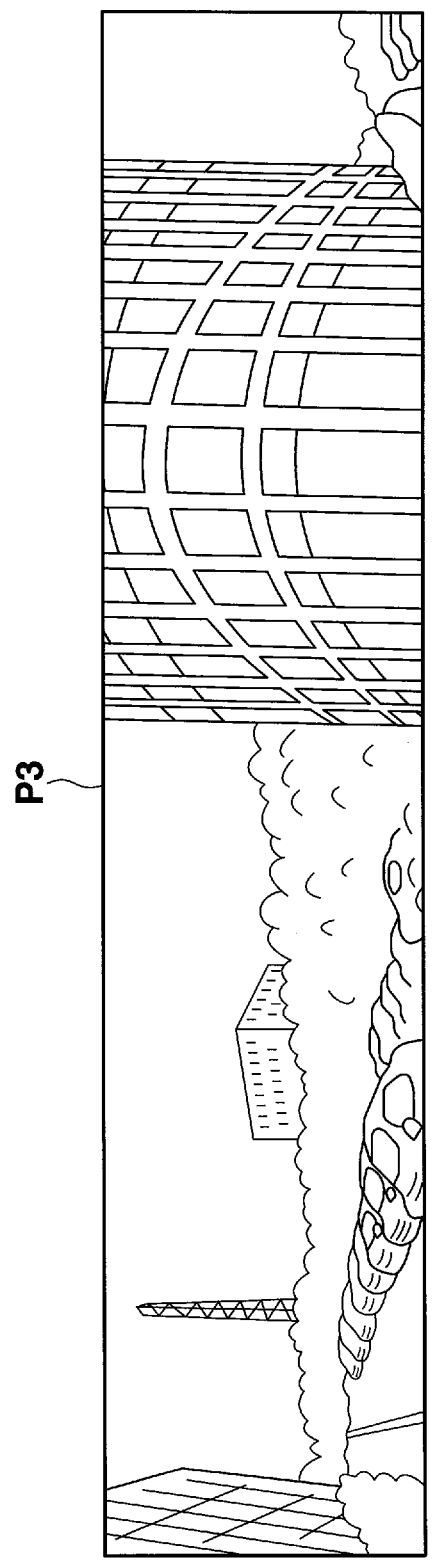
FIG. 4 is a diagram showing one example of panoramic image generated in the panoramic image capture mode shown in FIGS. 3A and 3B.

FIG. 4 shows one example of a panoramic image acquired by the panoramic image capture processing.

In the panoramic image capture mode, when an image capture operation such as shown in FIG. 3B is performed, the image capture control unit 51 controls the execution of the panoramic image capture processing. As a result, image data of a panoramic image P3 shown in FIG. 4 is generated and stored in the removable media 31.

In addition, in the present embodiment, regardless of whether in the normal image capture mode or in the panoramic image capture mode, the image capture control unit 51 shown in FIG. 2 executes live-view image capture processing and live-view image display processing.

Before the full press operation, the user can press the shutter switch 41 of the operation unit 20 half way down (as far as a predetermined position but short of its lower limit) in order to cause the digital camera 1 to execute AF (Auto Focus) processing, or the like. Hereinafter, the above-described operation of pressing the shutter switch half way down (as far as a predetermined position but short of its lower limit) is referred to as "half press operation" or simply "half press".

When a half press operation is performed, the image capture control unit 51 controls the image capturing unit 16 and the image processing unit 17 to continue the image capturing by the image capturing unit 16. While the image capturing is continued by the image capturing unit 16, the image capture control unit 51 temporarily stores in a memory (the storing unit 18, in the present embodiment) image data of frames outputted from the image processing unit 17 via the image capturing unit 16. Such a series of processes by the image capture control unit 51 is referred to as "live-view image capture processing".

Also, the image capture control unit 51 controls the display control unit 54 to sequentially read the image data of each frame image temporarily stored in the memory (the storing unit 18 in the present embodiment) at the time of the live-view image capturing and to cause the display unit 19 to sequentially display each frame image corresponding to the image data. Such a series of processes by the image capture control unit 51 is referred to as "live-view image display processing". Hereinafter, a frame image that is displayed on the display unit 19 by the live-view image display processing is referred to as "live-view image".

Furthermore, in the present embodiment, when a full press operation is performed in a state in which the panoramic image capture mode is selected, an image (hereinafter, referred to as "panoramic image in progress") showing an area so far captured from the panoramic image to be generated is superimposed on the live-view image displayed on the display unit 19.

Figure 5A:
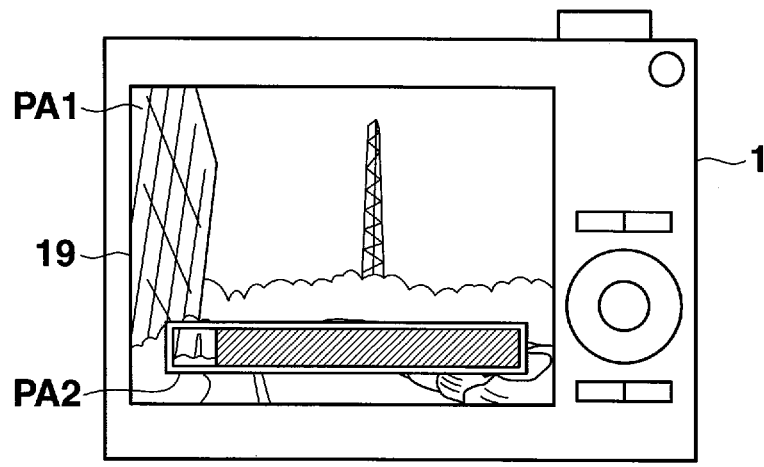
FIGS. 5A to 5C are rear views showing an external configuration of the digital camera shown in FIG. 1 displaying a panoramic image in progress.
Figure 5B:
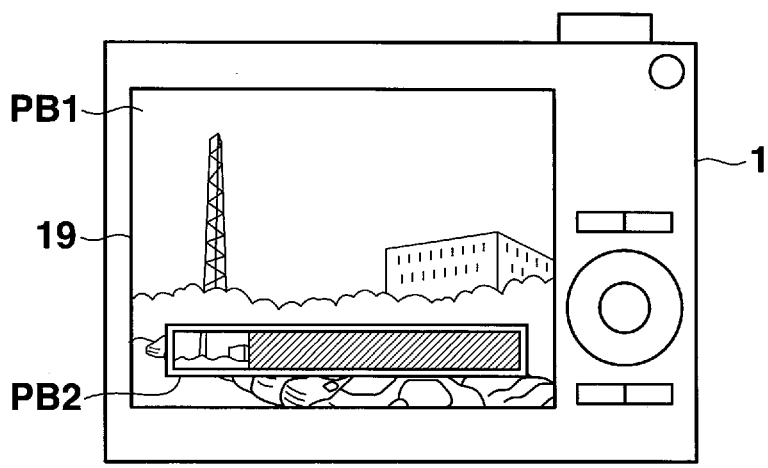
Figure 5C:
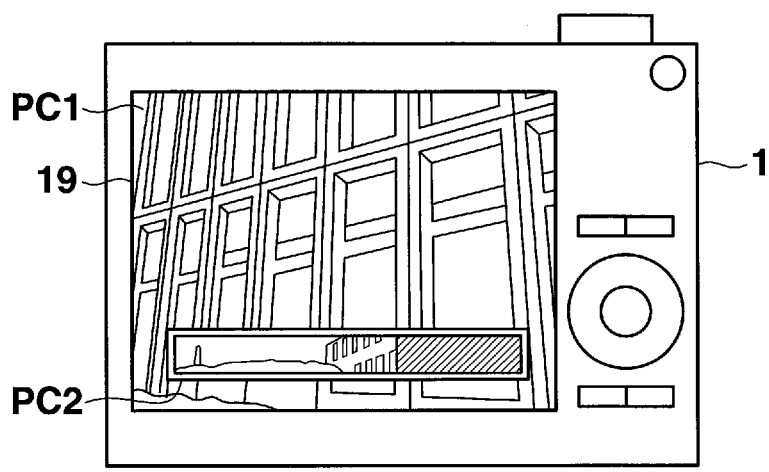

FIGS. 5A to 5C are rear views showing an external configuration of the digital camera 1 shown in FIG. 1 displaying a panoramic image in progress.

FIG. 5A shows an external configuration of the digital camera 1 at the position "a" of FIG. 3B. FIG. 5B shows an external configuration of the digital camera 1 at the position "b" of FIG. 3B. FIG. 5C shows an external configuration of the digital camera 1 at the position "c" of FIG. 3B.

This means that FIGS. 5A to 5C show a transition of respective display states of the digital camera 1 while the user sequentially moves the digital camera 1 from the position a to the position c in the panoramic image capture mode.

More specifically, while the digital camera 1 moves to the positions a, b, and c in turn, the display unit 19 sequentially displays the live-view images PA1, PB1, and PC1 respectively corresponding to the positions a, b, and c. Furthermore, in the present embodiment, the panoramic images in progress PA2, PB2, and PC2 are superimposed respectively on the live-view images PA1, PB1, and PC1.

Since the user can perform the operation of panoramic image capturing while viewing and recognizing such panoramic images in progress, PA2, PB2, and PC2, it becomes possible to easily and accurately view and recognize the histories of image capturing from the start of the panoramic image capturing up to the present. As a result, the user can easily acquire a desired panoramic image without repeating the image capturing operation many times.

As shown in FIG. 2, the CPU 11 of the digital camera 1 is provided with, as well as the above-described image capture control unit 51, the image composition unit 52, the image reduction unit 53, and the display control unit 54 in order to enable this type of display of the panoramic image in progress.

Incidentally, as described above, the functions of the image composition unit 52, the image reduction unit 53, and the display control unit 54 are not necessarily embedded in the CPU 11, as in the present embodiment, and it is possible to transfer at least a part thereof to the image processing unit 17.

The image composition unit 52 executes processing (hereinafter, referred to as "image composition processing") of horizontally combining image data of the frames, which are sequentially supplied from the image processing unit 17, in the supplied order. As a result of the image composition processing, image data of a panoramic image in progress is acquired and supplied to the image reduction unit 53.

More specifically, for example, the image capture control unit 51 monitors the detection result of the angular velocity sensor 22 and, each time the cumulative value of angular displacement reaches a constant value, issues an acquisition instruction to acquire image data of a frame. The image composition unit 52, immediately after receiving the acquisition instruction, acquires the image data of the frame supplied from the image processing unit 17 as a target to be combined. This means that the image composition unit 52 sequentially acquires image data of a frame to be combined each time the image capture control unit 51 issues an acquisition instruction from the start of the full press operation of the shutter switch 41.

The image composition unit 52 horizontally and sequentially combines the image data of the plurality of frames, which have been acquired as targets to be combined from the start of the full press operation of the shutter switch 41 until the present, in the acquired order.

As a result of such image composition processing, the image composition unit 52 acquires image data of a panoramic image in progress and supplies it to the image reduction unit 53.

Here, images of the image data to be targets for the image composition processing are not limited and may be each frame of the image data acquired from the start of a full press operation of the shutter switch 41 until the present, for example. In the present embodiment, however, image data of a panoramic image in progress generated in the previous image composition processing and image data of the frame lastly acquired as a target to be combined are employed as targets for the image composition processing.

In the present embodiment, the size (resolution) of a panoramic image in progress generated by the image composition unit 52 is assumed to be fixed at the same size as the maximum possible size of a panoramic image finally generated.

For this reason, in the process of capturing a panoramic image, i.e., while the digital camera 1 is being moved, although several frames of the image data so far acquired are horizontally combined, the horizontal size of the combined frames will not reach the maximum width, and therefore a partial area of the panoramic image in progress remains unfilled with effective images of the frames. In the present embodiment, such a partial area is uniformly painted in a predetermined color (e.g., hatching, in the example of FIGS. 5A to 5C). Hereinafter, such a partial area, i.e., an area consisting of uniformly constant pixel values (e.g., uniformly with 0 indicating hatching) is referred to as "blank area".

In the present embodiment, using the image data of the previous panoramic image in progress and the image data of the frame lastly acquired as a target to be combined, the image composition unit 52 executes image composition processing that overwrites the frame to be combined on the blank area of the previous panoramic image in progress.

FIG. 6 is a diagram illustrating the image composition processing executed by the image composition unit 52 shown in FIG. 2.

In the present embodiment, it is assumed that a storage area 101 shown in FIG. 6 is provided in the storing unit 18, for example.

The storage area 101 is segmented into N frame storage areas 101-1 to 101-N. Here, N is an arbitrary integer greater than 1 with a reservation that the size in a horizontal direction (the x-axis in FIG. 6) of the frame storage areas 101-1 to 101-N matches the size of the panoramic image in progress, i.e., the maximum possible size in a horizontal direction of the panoramic image finally generated. Also, N matches the maximum possible number of frames of the data which can be acquired by the image composition unit 52 to be combined throughout the panoramic image capture processing.

When a K-th acquisition instruction is issued after the panoramic image capture processing has started by a full press operation of the shutter switch 41, at least a part of the image data of the frame acquired to be combined by the image composition unit 52 is stored in the frame storage area 101-K.

The reason for the description of "at least a part of image data of the frame" is because there may be a case in which the pixel size of image data of a frame is greater than the pixel size of the frame storage area 101-K. In such a case, image data corresponding to only a predetermined part of the frame is stored in the frame storage area 101-K.

As described above, in the present embodiment, the entire image data stored in the storage area 101 is the image data of a panoramic image in progress. As an initial state, the storage area 101 uniformly stores identical pixel values (e.g., 0 indicating hatching). That means that, in an initial state, the entire N frame storage areas 101-1 to 101-N contain data indicative of a blank area.

Therefore, at a time when the image data of the K-th frame to be combined is acquired by the image composition unit 52, the frame storage areas 101-1 to 101-(K−1), from among the N frame storage areas 101-1 to 101-N, contain image data of an effective image. Here, the effective image is intended to mean an image acquired as a result of combining at least a part of each one of the 1st to (K−1)-th frames to be combined in a horizontal direction (x-axis in FIG. 6) in the numbered order. On the other hand, the frame storage areas 101-K to 101-N still contain data indicative of a blank area.

At least a part of image data of the frame acquired for the K-th time to be combined is stored in the frame storage area 101-K from among frame storage areas 101-K to 101-N containing data of a blank area. Thus, the entire data stored in the storage area 101 forms image data of a panoramic image in progress.

After that, the image composition unit 52 shown in FIG. 2 reads the entire data stored in the storage area 101 as image data of a panoramic image in progress and supplies it to the image reduction unit 53.

Each time image data of a panoramic image in progress is supplied from the image composition unit 52, the image reduction unit 53 executes reduction processing to reduce the size (resolution) of the image data. Here, the rate of reduction can be arbitrarily set within a range such that the panoramic image in progress is smaller than the live-view image (frame).

The image data of the panoramic image in progress thus reduced in size (resolution) is supplied from the image reduction unit 53 to the display control unit 54.

The display control unit 54 performs control to cause the display unit 19 to display, as a live-view image, a frame expressed by the image data temporarily stored in the storing unit 18.

Furthermore, in the panoramic image capture processing, the display control unit 54 performs control to cause the display unit 19 to superimpose an image expressed by the reduced image data supplied from the image reduction unit 53, i.e., the reduced panoramic image in progress, on the live-view image.

After that, when the user's finger or the like is released from the shutter switch 41, i.e., when a release operation is performed, the image capture control unit 51 performs control to cause the removable media 31 to store the image data to be recorded.

More specifically, in the case of the normal capture mode, the image capture control unit 51 performs control to cause the removable media 31 to store image data of a frame outputted from the image processing unit 17 as the image data to be recorded.

On the other hand, in the case of the panoramic capture mode, the image capture control unit 51 performs control to cause the removable media 31 to store image data of a panoramic image via the image composition unit 52.

For example, the image composition unit 52 reads image data of an effective image from an area other than the blank area of the storage area 101 (FIG. 6), and executes image processing such as reduction or expansion as appropriate thereon. With this, image data of a panoramic image to be recorded is generated. Thus, generated image data of the panoramic image is supplied to the drive 23 and stored in the removable media 31 as the image data to be recorded.

In the following, a description will be given of the image capture processing carried out by the digital camera 1 having this type of functional configuration with reference to FIG. 7.

Figure 7:
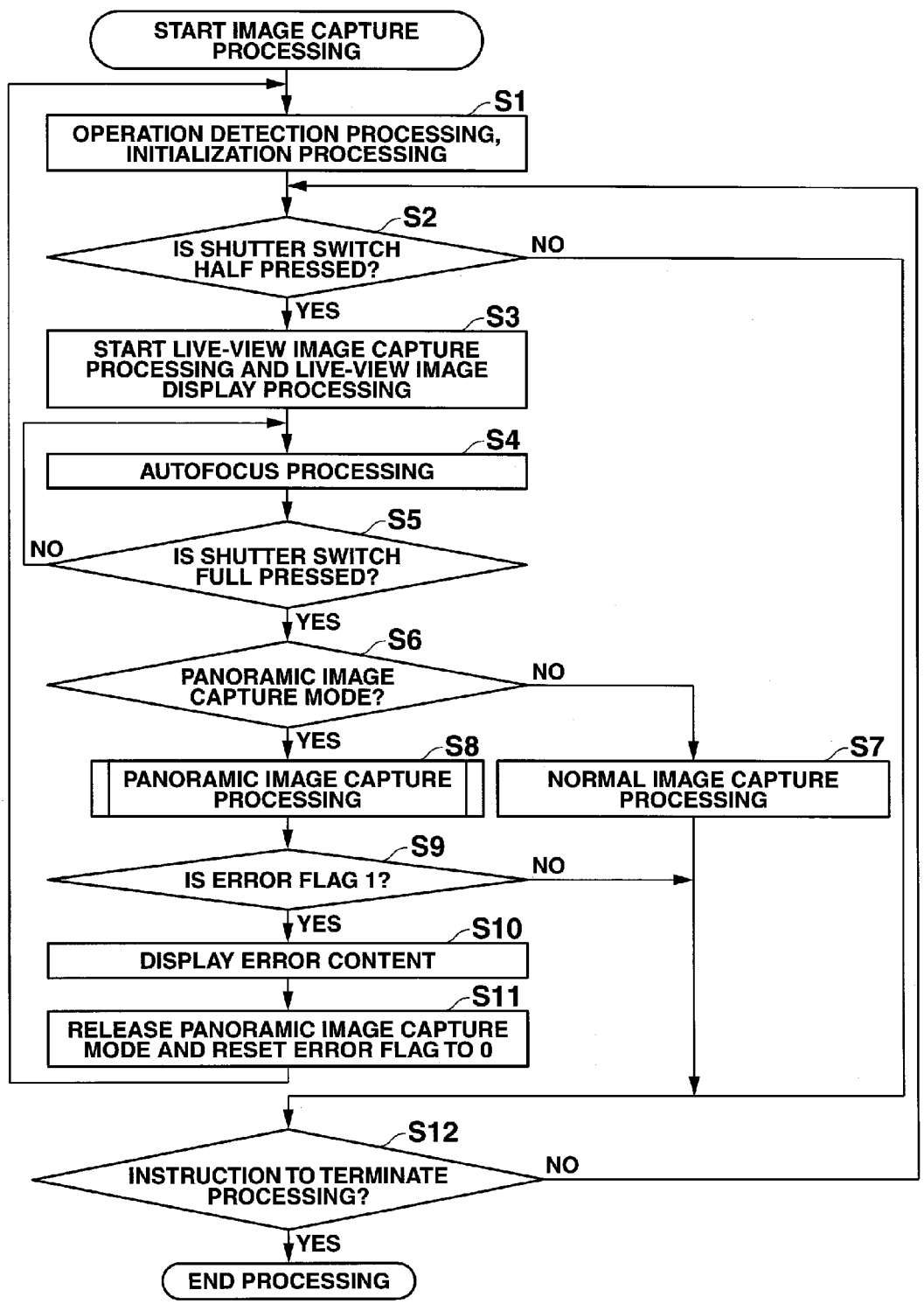
FIG. 7 is a flowchart showing one example of flow of image capture processing.

FIG. 7 is a flowchart showing one example of flow of the image capture processing.

In the present embodiment, the image capture processing starts when the power supply (not shown) of the digital camera 1 is turned on.

In step S1, the image capture control unit 51 executes operation detection processing and initialization processing.

The operation detection processing is intended to mean a process of detecting the states of switches of the operation unit 20. By executing the operation detection processing, the image capture control unit 51 can detect whether the normal image capture mode or the panoramic image capture mode is specified as the operation mode.

The initialization processing in the present embodiment includes a process of setting a constant value of the angular displacement and a threshold value (e.g., 360 degrees) as an upper limit of the angular displacement.

More specifically, the constant value of the angular displacement and the threshold value (e.g., 360 degrees) as an upper limit of the angular displacement are stored in advance in the ROM 12 shown in FIG. 1, and those values are set after being read from the ROM 12 and written into the RAM 13. The constant value of the angular displacement is used in the determination process of step S35 of FIG. 8, which will be described later. On the other hand, the threshold value (e.g., 360 degrees) as an upper limit of the angular displacement is used in the determination process of step S45 of FIG. 8.

Furthermore, in the present embodiment, the angular displacement detected by the angular velocity sensor 22 is accumulatively added, for example, as shown in steps S34 and S40 of FIG. 8, which will be described later. As a result of accumulation thereof, a cumulative angular displacement and a total angular displacement are stored in the RAM 13. The difference between the cumulative angular displacement and the total angular displacement will be described later. Therefore, processes of resetting the cumulative angular displacement and the total angular displacement to 0 are included in the initialization processing in the present embodiment. The cumulative angular displacement is compared with the above-described constant value in the determination process of step S35 of FIG. 8, which will be described later. On the other hand, the total angular displacement is compared with the above-described threshold value in the determination process of step S45 of FIG. 8, which will be described later.

Furthermore, the initialization processing in the present embodiment includes a process of resetting an error flag to 0. The error flag is intended to mean a flag that is set to 1 when an error occurs during the panoramic image capture processing (see step S44 of FIG. 8, which will be described later).

In step S2, the image capture control unit 51 determines whether or not the shutter switch 41 is half pressed.

If the shutter switch 41 is not half pressed, a determination of NO is made in step S2, and control proceeds to step S12.

In step S12, the image capture control unit 51 determines whether or not it is instructed to terminate the processing.

In the present embodiment, it is assumed that, as the instruction to terminate the processing, notification is used which indicates that the power supply (not shown) of the digital camera 1 has been turned off, though the instruction to terminate the processing is no particular limitation thereto.

Therefore, in the present embodiment, when the image capture control unit 51 is notified that the power supply has been turned off, a determination of YES is made in step S12, and the entire image capture processing ends.

On the other hand, when the power supply is on, since image capture control unit 51 is not notified that the power supply has been turned off, a determination of NO is made in step S12, control goes back to step S2, and the processes thereafter are repeated. This means that, in the present embodiment, as long as the power is on, the loop processing from steps S2: NO, to S12: NO, is repeated until the shutter switch 41 is half pressed, and the image capture processing enters into a waiting state.

When the shutter switch 41 is half pressed during the waiting state, a determination of YES is made in step S2, and control proceeds to step S3.

In step S3, the image capture control unit 51 starts the live-view image capture processing and the live-view image display processing, which have been described earlier.

With this, the live-view image is displayed on the display unit 19. In the present embodiment, it is assumed that the live-view image is continuously displayed on the display unit 19 until the normal image capture processing of step S7 or the panoramic image capture processing of step S8 ends, which will be described later.

In step S4, the image capture control unit 51 controls the image capturing unit 16 to execute what is called AF processing.

In step S5, the image capture control unit 51 determines whether or not the shutter switch 41 has been fully pressed.

If the shutter switch 41 has not been fully pressed, a determination of NO is made in step S5. In such a case, control goes back to step S4, and the processes thereafter are repeated. This means that, in the present embodiment, the loop processing from step S4 and step S5: NO is repeated until the shutter switch 41 is fully pressed, and the AF processing is executed each time the loop processing is repeated.

After that, when the shutter switch 41 is fully pressed, a determination of YES is made in step S5, and control proceeds to step S6.

In step S6, the image capture control unit 51 determines whether or not the operation mode currently set is the panoramic image capture mode.

If the operation mode is not the panoramic image capture mode, i.e., the normal image capture mode is currently set, a determination of NO is made in step S6, and control proceeds to step S7.

In step S7, the image capture control unit 51 executes the above-described normal image capture processing.

This means that image data of one frame outputted from the image processing unit 17 immediately after the full press operation is stored in the removable media 31, as a target to be recorded. With this, the normal image capture processing of step S7 ends, and control proceeds to step S12. Since the processes of steps S12 and thereafter have been already described above, description thereof is omitted here.

On the other hand, if the panoramic image capture mode is currently set, a determination of YES is made in step S6, and control proceeds to step S8.

In step S8, the image capture control unit 51 executes the panoramic image capture processing described above.

Though the detailed description of the panoramic image capture processing will be given later with reference to FIG. 8, basically, image data of a panoramic image is generated and stored in the removable media 31 as a target to be recorded. With this, the panoramic image capture processing of step S8 ends, and control proceeds to step S9.

In step S9, the image capture control unit 51 determines whether or not the error flag is set to 1.

With the detailed description to be given later with reference to FIG. 8, if the image data of the panoramic image is stored in the removable media 31 as a target to be recorded and thereby the panoramic image capture processing of step S8 properly ends, the error flag is set to 0. In such a case, a determination of NO is made in step S9, and control proceeds to step S12. Since the processes of steps S12 and thereafter have been already described above, description thereof is omitted here.

On the other hand, if some error has occurred during the panoramic image capture processing of step S8, the panoramic image capture processing improperly ends. In such a case, since the error flag is set to 1, a determination of YES is made in step S9, and control proceeds to step S10.

In step S10, the image capture control unit 51 displays the error content on the display unit 19. Specific examples of the error content to be displayed will be described later.

In step S11, the image capture control unit 51 releases the panoramic image capture mode and resets the error flag to 0.

After that, control goes back to step S1, and processes thereafter are repeated. This means that the image capture control unit 51 waits for another image capture operation by the user.

In the above, a description has been given of flow of the image capture processing with reference to FIG. 7.

In the following, a description will be given of detailed flow of the panoramic image capture processing of step S8 of the image capture processing of FIG. 7.

Figure 8:
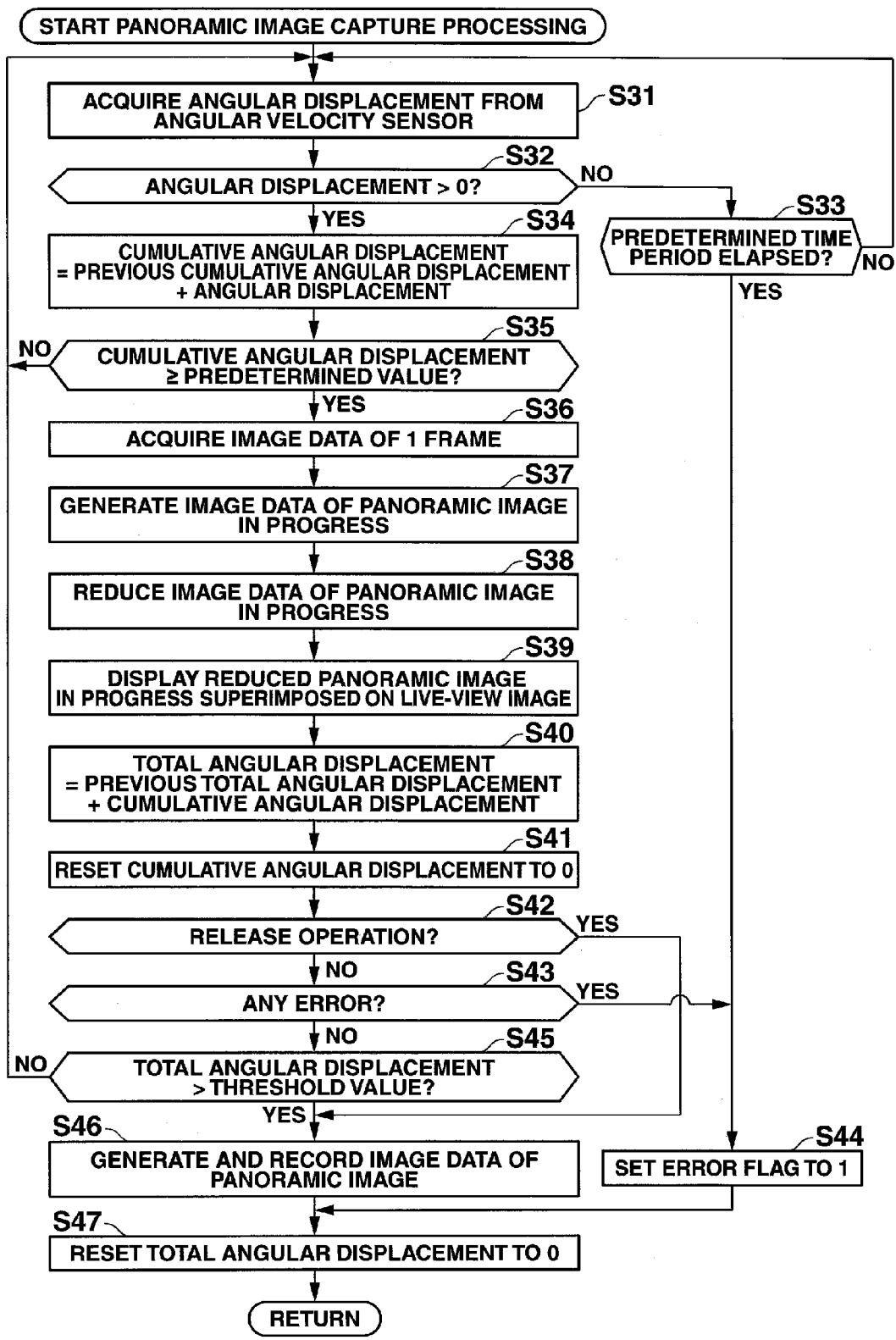
FIG. 8 is a flowchart showing a detailed flow of panoramic image capture processing among the image capture processing of FIG. 7.

FIG. 8 is a flowchart showing a detailed flow of the panoramic image capture processing.

As described above, when the shutter switch 41 is full pressed in the panoramic image capture mode, a determination of YES is made in step S6 of FIG. 7, control proceeds to step S8, and the following processing is executed as the panoramic image capture processing.

That is, in step S31 of FIG. 8, the image capture control unit 51 acquires angular displacement from the angular velocity sensor 22.

In step S32, the image capture control unit 51 determines whether or not the angular displacement acquired in the process of step S31 is greater than 0.

If the user has not moved the digital camera 1, the angular displacement is equal to 0. Therefore, a determination of NO is made in step S32, and control proceeds to step S33.

In step S33, the image capture control unit 51 determines whether or not a predetermined time period for which the angular displacement continues to be 0 has elapsed. As the predetermined time period, for example, a time period can be employed that is appropriately longer than a time period necessary for the user to start to move the digital camera 1 after the full press of the shutter switch 41.

If the predetermined time period has not yet elapsed, a determination of NO is made in step S33, control goes back to step S31, and the processes thereafter are repeated. As long as the duration of a state in which the user does not move the digital camera 1 does not exceed the predetermined time, the image capture control unit 51 repeats the loop processing from steps S31 to S33: NO, and thereby the panoramic image capture processing enters into a waiting state.

In such a waiting state, if the user moves the digital camera 1, the angular displacement supplied from the angular velocity sensor 22 becomes greater than 0. In such a case, a determination of YES is made in step S32, and control proceeds to step S34.

In step S34, the image capture control unit 51 updates the cumulative angular displacement by adding the angular displacement acquired in the process of step S31 to the previous cumulative angular displacement (cumulative angular displacement=previous cumulative angular displacement+angular displacement). In this way, the value stored in the RAM 13 as the cumulative angular displacement is updated.

The cumulative angular displacement is intended to mean such an accumulated value of the angular displacement and indicates the moving amount of the digital camera 1.

Here, in the present embodiment, each time the user moves the digital camera 1 by a predetermined amount, it is assumed that image data of one frame (target to be combined) for generation of image data of a panoramic image in progress is supplied from the image processing unit 17 to the image composition unit 52.

For this purpose, a cumulative angular displacement corresponding to the "predetermined amount" as moving amount of the digital camera 1 has been given in advance as the "constant value" in the initialization processing of step S1 of FIG. 7.

In the present embodiment, each time the cumulative angular displacement reaches the constant value, image data of one frame (target to be combined) is supplied from the image processing unit 17 to the image composition unit 52, and the cumulative angular displacement is reset to be 0.

Such a series of processing is carried out as processes of a subsequent step S35 and thereafter.

In step S35, the image capture control unit 51 determines whether or not the cumulative angular displacement has reached the constant value.

If the cumulative angular displacement has not yet reached the constant value, a determination of NO is made in step S35, control goes back to step S31, and processes thereafter are repeated. This means that until the cumulative angular displacement has reached the constant value due to the fact that the user has moved the digital camera 1 by the predetermined amount, the image capture control unit 51 repeats the loop processing from steps S31 to S35.

After that, when the cumulative angular displacement has reached the constant value due to the fact that the user has moved the digital camera 1 by the predetermined amount, a determination of YES is made in step S35, and control proceeds to step S36.

In step S36, the image composition unit 52 acquires image data of one frame from the image processing unit 17 under control of the image capture control unit 51.

This means that after control proceeds to step S36 due to the fact that the cumulative angular displacement has reached the constant value, the image capture control unit 51 issues an acquisition instruction to the image composition unit 52.

Upon receiving the acquisition instruction, the image composition unit 52 acquires image data of one frame from the image processing unit 17, as the process of step S36.

In step S37, the image composition unit 52 overwrites (at least a part of) the image data of the acquired frame on the data of the blank area stored in the storage area 101 (FIG. 6) and thereby generates image data of a panoramic image in progress.

When the image data of the panoramic image in progress is supplied from the image composition unit 52 to the image reduction unit 53, control proceeds to step S38.

In step S38, the image reduction unit 53 reduces the size (resolution) of the supplied image data of the panoramic image in progress.

When the reduced image data of the panoramic image in progress is supplied from the image reduction unit 53 to the display control unit 54, control proceeds to step S39.

In step S39, the display control unit 54 causes the display unit 19 to display the image expressed by the image data supplied from the image reduction unit 53, i.e., the reduced panoramic image in progress, superimposed on the live-view image.

In step S40, the image capture control unit 51 updates the total angular displacement by adding the current cumulative angular displacement, which is approximately equal to the constant value, to the previous total angular displacement (total angular displacement=previous total angular displacement+cumulative angular displacement). In this way, the value stored in the RAM 13 as the total angular displacement is updated.

In step S41, the image capture control unit 51 resets the cumulative angular displacement to 0. This means that the value stored in the RAM 13 as the cumulative angular displacement is updated to 0.

In this way, the cumulative angular displacement is used for controlling the timing of the image data of one frame (target to be combined) being supplied from the image processing unit 17 to the image composition unit 52, i.e., the timing of issuing the acquisition instruction. For this purpose, the cumulative angular displacement is reset to 0 each time the constant value is reached and the acquisition instruction is issued.

Accordingly, even if the cumulative angular displacement is used, the image capture control unit 51 cannot recognize how far the digital camera 1 has moved from the panoramic image capture processing starting up until the present.

In order to make it possible for the image capture control unit 51 to recognize how far the digital camera 1 has moved, in the present embodiment, the total angular displacement is employed in addition to the cumulative angular displacement.

The total angular displacement is an accumulated value of the angular displacement, but is not reset to 0 even if the cumulative angular displacement has exceeded the predetermined amount, and is always accumulatively added until the panoramic image capture processing ends (more precisely, until the process of step S47, which will be described later, is executed).

After the total angular displacement is updated in the process of step S40 and the cumulative angular displacement is reset to 0 in the process of step S41, control proceeds to step S42.

In step S42, the image capture control unit 51 determines whether or not release operation has been performed (full press operation has been released).

If no release operation has been performed, i.e., if the shutter switch 41 is still full pressed by the user, a determination of NO is made in step S42, and control proceeds to step S43.

In step S43, the image capture control unit 51 determines whether or not any error has occurred in image capturing.

Though error in image capturing is not particularly limited, in the present embodiment, as an error in image capturing, any movement of the digital camera 1 in an oblique, upward, downward, or reverse direction by more than a predetermined amount is employed.

If no error in image capturing has occurred, a determination of NO is made in step S43, and control proceeds to step S45.

In step S45, the image capture control unit 51 determines whether or not the total angular displacement has exceeded the threshold value.

As described above, the total angular displacement is intended to mean an accumulated value of angular displacement from the point in time when the panoramic image capture processing starts (when full press operation has been performed) until the point in time when the process of step S40 is executed.

In the present embodiment, the maximum possible amount by which the user can move the digital camera 1 during the panoramic image capturing is predetermined. The total angular displacement corresponding to the "maximum moving amount" as moving amount of the digital camera 1 has been given in advance as the "threshold value" in the initialization processing of step S1 of FIG. 7.

This means that, in the present embodiment, the fact that the total angular displacement has reached the threshold value means that the digital camera 1 has moved by the maximum moving amount.

Therefore, if the total angular displacement has not reached the threshold value, i.e., the moving amount of the digital camera 1 has not reached the maximum moving amount, the user can still continue to move the digital camera 1. In this case, a determination of NO is made in step S45, control goes back to step S31, and processes thereafter are repeated.

Assuming that a state in which the time period for which the angular displacement continues to be zero reaches a predetermined time period (the digital camera 1 has not moved for the predetermined time period) is included as one error in image capturing, as long as the full press operation continues in a state no error has occurred in, the loop processing from steps S31 to S45 is repeated.

During such loop processing, as described above with reference to FIGS. 5A to 5C, the displays of both the live-view image and the panoramic image in progress continue to be updated in accordance with the movement of the digital camera 1.

Since the user can perform operation of the panoramic image capturing while viewing and recognizing such a panoramic image in progress being continuously updated, it becomes possible to easily view and recognize the histories of image capturing with accuracy from the onset of the panoramic image capturing up to the present. As a result, the user can easily acquire a desired panoramic image without repeating the image capture operation many times.

After that, if a release operation is performed in a state in which no error has occurred (i.e., YES is determined in the process of step S42) or if the digital camera 1 has moved by more than the maximum moving amount (i.e., YES is determined in the process of step S45), then control proceeds to step S46.

In step S46, the image capture control unit 51 generates image data of a panoramic image by the image composition unit 52, and stores it in the removable media 31 as the image data to be recorded.

In step S47, the image capture control unit 51 resets the total angular displacement to 0.

With this, the panoramic image capture processing properly ends. This means that the process of step S8 of FIG. 7 properly ends, and a determination of NO is made in the process of the next step S9. Since the processes after NO is determined in the process of step S9 have been already described above, description thereof is omitted here.

During the series of processes described above, if some error occurs, i.e., if YES is determined in the process of step S33, or if YES is determined in the process of step S43, then control proceeds to step S44.

In step S44, the image capture control unit 51 sets the error flag to 1.

In this case, the process of step S46 is not executed, i.e., no image data of any panoramic image is recorded, and the panoramic image capture processing improperly ends.

This means that the process of step S8 of FIG. 7 improperly ends, YES is determined in the process of the subsequent step S9, and error content is displayed in the process of step S10.

What is displayed as error content in this case is not limited as described above, and, for example, a message such as "Image capture failure" or "Time is over" may be displayed.

As described above, the digital camera 1 of the present embodiment is provided with an image capturing unit 16, which sequentially outputs data of each image sequentially acquired by capturing an image at a predetermined time interval, as image data of a frame.

The digital camera 1 of the present embodiment is also provided with an image composition unit 52 and a display control unit 54.

The image composition unit 52 acquires image data of a frame outputted from the image capturing unit 16 by the image processing unit 17 each time the digital camera 1 moves by a predetermined amount (each time the above-described cumulative angular displacement reaches a constant value) and stores it in the storing unit 18. Furthermore, the image composition unit 52 combines at least a part of image data of a plurality of frames that have been cumulatively stored in the storing unit 18, and thereby sequentially generates image data of a panoramic image in progress (composite image).

The display control unit 54 performs control to display frames (i.e., live-view images) of image data sequentially outputted from the image capturing unit 16, simultaneously with panoramic images in progress (composite images) of the image data sequentially generated by the image composition unit 52.

With this, as described above with reference to FIGS. 5A to 5C, the displays of both the panoramic image in progress (composite image) and the live-view image continue to be updated in accordance with the movement of the digital camera 1.

Since the user can perform the operation of the panoramic image capturing while viewing and recognizing such panoramic images in progress (composite image) being continuously updated, it becomes possible to easily view and recognize the histories of image capturing with accuracy from the start of the panoramic image capturing up to the present. As a result, the user can easily acquire a desired panoramic image without repeating the image capture operation many times.

Especially, in the digital camera 1 of the present embodiment the display control unit 54 performs control to cause the display unit 19 to display a panoramic image in progress (composite image) superimposed on a live-view image.

In this case, since the user can simultaneously view and recognize both the live-view image and the panoramic image in progress, it becomes possible to view and recognize a subject currently captured in the live-view image and to view and recognize with accuracy where the subject is included in the panoramic image.

The digital camera 1 of the present embodiment is further provided with an image reduction unit 53 that reduces the size of image data of a panoramic image in progress.

With this, the display control unit 54 can superimpose the reduced panoramic image in progress on the live-view image.

In this case, since the panoramic image in progress does not hinder the live-view image from being displayed, the user is ensured of being able to view and recognize a subject to be captured subsequently from the live-view image.

In the digital camera 1 of the present embodiment, the image composition unit 52 generates image data of a panoramic image as composite image data to be recorded if a predetermined condition is satisfied such that a release operation has been performed or that the total angular displacement has reached the threshold value.

In this case, the image capture control unit 51 performs control to store in the removable media 31 the image data of the panoramic image generated to be recorded.

Thus, it becomes possible for the user to easily store image data of a desired panoramic image in the removable media 31 without repeating image capture operation many times.

It should be noted that the present invention is not limited to the embodiment described above, and any modifications and improvements are included within the scope of the present invention as long as an object of the present invention can be realized.

For example, in the embodiment described above, it has been described that the display unit 19 displays a reduced panoramic image in progress superimposed on a live-view image, the display forms of the live-view image and the panoramic image in progress are not limited thereto, and any display forms may be employed as long as both of the live-view image and the panoramic image in progress can be simultaneously displayed.

For example, the screen of the display unit 19 may be divided into upper and lower parts, so that one of the upper and lower parts displays the live-view image and the other of the upper and lower parts displays the panoramic image in progress.

As described above, since the live-view image and the panoramic image in progress are displayed in a clearly distinguishable manner, it becomes possible for the user to more clearly view and recognize the panoramic image in progress that shows the formation process of a panoramic image. This means that the user can more easily view and recognize the history of image capturing with higher accuracy from the onset of the panoramic image capturing until the present, and it becomes possible to easily acquire a desired panoramic image with much less image capture operation.

Furthermore, for example, the panoramic image in progress may be displayed unreduced in size as necessary.

Furthermore, in the present embodiment, it has been described that the image composition unit 52 executes image composition processing by overwriting the frame to be combined on the blank area of the previous panoramic image in progress using the image data of the previous panoramic image in progress and the image data of the frame lastly acquired to be combined. However, only the effective image of the panoramic image in progress may be displayed without displaying the blank area.

Furthermore, although in the embodiment described above the image reduction unit 53 is provided in a later stage of the image composition unit 52, the image reduction unit 53 may be provided in an earlier stage of the image composition unit 52. In this case, the image reduction unit 53 may sequentially reduce image data of frames sequentially supplied from the image processing unit 17. In this case, the image composition unit 52 may generate image data of a panoramic image in progress by combining image data of each frame that has already been reduced.

Furthermore, although a description was given in the embodiment described above that the angular displacement of the digital camera 1 is detected by way of the angular velocity sensor 22, the method of detecting the angular displacement is not limited to this.

For example, a method may be employed such that the angular displacement of the digital camera 1 is detected by way of image processing by analyzing the live-view image.

Furthermore, although a description was given in the embodiment described above that the forms of the panoramic image in progress and the panoramic image are landscape-oriented, the present invention is not limited to this. The form of the panoramic image in progress and the panoramic image may be portrait-oriented, i.e., elongated in a direction in which the digital camera 1 is moved.

Furthermore, a description was given in the embodiment described above that the image capturing apparatus according to the present invention is configured by a digital camera.

However, the present invention is not limited to this and can be applied to any electronic device having an image capture function capable of panoramic image capturing. For example, the present invention can be applied to a portable personal computer, a portable navigation device, a portable game device, and the like.

The series of processing described above can be executed by hardware and also can be executed by software.

In a case in which the series of processing is to be executed by software, the program configuring the software is installed from a network or a storage medium in an image capturing apparatus or a computer that controls the image capturing apparatus. The computer may be a computer incorporated in dedicated hardware. Alternatively, the computer may be a computer capable of executing various functions by installing various programs, i.e., a general-purpose personal computer, for example.

The storage medium containing the program can be configured not only by removable media 31 distributed separately from the device main body for supplying the program to a user, but also by a storage medium or the like supplied to the user in a state incorporated in the device main body in advance. The removable media 31 is composed of a magnetic disk (including a floppy disk), an optical disk, a magnetic optical disk, or the like, for example. The storage medium supplied to the user in the state incorporated in the device main body in advance includes the ROM 12 storing the program, a hard disk included in the storing unit 18, and the like, for example.

It should be noted that, in the present description, the step describing the program stored in the storage medium includes not only the processing executed in a time series following this order, but also includes processing executed in parallel or individually, which is not necessarily executed in a time series.

What is claimed is:

1. An image capturing apparatus, comprising:
    an image capturing unit that includes an image sensor and that sequentially captures images; and
    a processor which is configured to function as:
        an image generation unit that generates panoramic image data from the images captured by the image capturing unit;
        a display control unit that causes a display to separately and simultaneously display (i) a panoramic image in progress corresponding to the panoramic image data generated by the image generation unit and (ii) a live-view image corresponding to an image that is newly captured by the image capturing unit while images are being captured by the image capturing unit;

a reception unit that receives an instruction to terminate image capture processing for generating the panoramic image data while the panoramic image in progress and the live-view image are being displayed; and a recording control unit that performs, in response to reception of the instruction, control to record, as a completed panoramic image, panoramic image data generated from the images captured by a time when reception of the instruction by the reception unit is finished, even if images have not yet been captured in a predetermined capture range set in advance for a full panoramic image to be generated.

2. The image capturing apparatus as set forth in claim 1, wherein the display control unit causes the display to display the panoramic image in progress such that the panoramic image in progress comprises (i) a first area corresponding to the panoramic image data and (ii) a second area to be overwritten with an image corresponding to an image to be newly captured by the image capturing unit, wherein the first area increases with progression of generation of the panoramic image data and the second area decreases with progression of the generation of the panoramic image data, wherein the image capture processing for generating the panoramic image data is terminated in accordance with receipt of the instruction to terminate the image capture processing, even if the second area still remains in the panoramic image in progress.

3. The image capturing apparatus as set forth in claim 1, further comprising a memory that stores data of the images captured by the image capturing unit, wherein the image generation unit generates the panoramic image data from the data of the images stored in the memory.

4. The image capturing apparatus as set forth in claim 1, wherein the display control unit causes the display to display the panoramic image in progress such that the panoramic image in progress is superimposed on the live-view image.

5. The image capturing apparatus as set forth in claim 4, wherein the display control unit causes the display to separately display the panoramic image in progress and the live-view image such that the panoramic image in progress is superimposed on a part of the live-view image.

6. The image capturing apparatus as set forth in claim 1, wherein the display control unit causes the display to display the panoramic image in progress such that the panoramic image in progress is not superimposed on the live-view image.

7. The image capturing apparatus as set forth in claim 1, wherein the display control unit causes the display to display the panoramic image in progress such that the panoramic image in progress is smaller than the live-view image.

8. The image capturing apparatus as set forth in claim 1, wherein the image capturing unit continues to perform image capture processing for capturing images to be displayed as the live-view image and the display control unit continues causing the display to display the live-view image, even when the reception unit receives the instruction to terminate the image capture processing for generating the panoramic image data.

9. The image capturing apparatus as set forth in claim 1, wherein the image capturing unit continues to perform image capture processing for capturing images to be displayed as the live-view image and the display control unit continues causing the display to display the live-view image, even when the image capture processing for generating the panoramic image data is terminated in accordance with receipt of the instruction to terminate the image capture processing for generating the panoramic image data.

10. A method performed by an image capturing apparatus which comprises a processor and an image capturing unit that includes an image sensor and that sequentially captures images, the method comprising:

generating, with the processor, panoramic image data from the images captured by the image capturing unit;

performing, with the processor, display control that causes a display to separately and simultaneously display (i) a panoramic image in progress corresponding to the generated panoramic image data and (ii) a live-view image corresponding to an image that is newly captured by the image capturing unit while images are being captured by the image capturing unit;

receiving, with the processor, an instruction to terminate image capture processing for generating the panoramic image data while the panoramic image in progress and the live-view image are being displayed; and performing control with the processor, in response to reception of the instruction, to record, as a completed panoramic image, panoramic image data generated from the images captured by a time when reception of the instruction is finished, even if images have not yet been captured in a predetermined capture range set in advance for a full panoramic image to be generated.

11. The method as set forth in claim 10, wherein, in the display control, the processor causes the display to display the panoramic image in progress such that the panoramic image in progress comprises (i) a first area corresponding to the panoramic image data and (ii) a second area to be overwritten with an image corresponding to an image to be newly captured by the image capturing unit, wherein the first area increases with progression of generation of the panoramic image data and the second area decreases with progression of the generation of the panoramic image data, and wherein the image capture processing for generating the panoramic image data is terminated in accordance with receipt of the instruction to terminate the image capture processing, even if the second area still remains in the panoramic image in progress.

12. The method as set forth in claim 10, wherein data of the images captured by the image capturing unit is stored in a memory, and the panoramic image data is generated from the data of the images stored in the memory.

13. The method as set forth in claim 10, wherein, in the display control, the processor causes the display to display the panoramic image in progress such that the panoramic image in progress is superimposed on the live-view image.

14. The method as set forth in claim 13, wherein, in the display control, the processor causes the display to separately display the panoramic image in progress and the live-view image such that the panoramic image in progress is superimposed on a part of the live-view image.

15. The method as set forth in claim 10, wherein, in the display control, the processor causes the display to display the panoramic image in progress such that the panoramic image in progress is not superimposed on the live-view image.

16. The method as set forth in claim 10, wherein, in the display control, the processor causes the display to display the panoramic image in progress such that the panoramic image in progress is smaller than the live-view image.

17. The method as set forth in claim 10, wherein the image capturing unit continues to perform image capture processing for capturing images to be displayed as the live-view image and, in the display control, the processor continues causing the display to display the live-view image, even when the instruction to terminate the image capture processing for generating the panoramic image data is received.

18. The method as set forth in claim 10, wherein the image capturing unit continues to perform image capture processing for capturing images to be displayed as the live-view image and, in the display control, the processor continues causing the display to display the live-view image, even when the image capture processing for generating the panoramic image data is terminated in accordance with receipt of the instruction to terminate the image capture processing for generating the panoramic image data.

19. A non-transitory computer-readable storage medium having stored thereon a program that is executable by a computer in an image capturing apparatus which comprises an image capturing unit that includes an image sensor and that sequentially captures images, the program being executable by the computer to make the computer execute functions comprising:
   generating panoramic image data from the images captured by the image capturing unit;
   performing display control that causes a display to separately and simultaneously display (i) a panoramic image in progress corresponding to the generated panoramic image data and (ii) a live-view image corresponding to an image that is newly captured by the image capturing unit while images are being captured by the image capturing unit;
   receiving an instruction to terminate image capture processing for generating the panoramic image data while the panoramic image in progress and the live-view image are being displayed; and
   performing, in response to reception of the instruction, control to record, as a completed panoramic image, panoramic image data generated from the images captured by a time when reception of the instruction is finished, even if images have not yet been captured in a predetermined capture range set in advance for a full panoramic image to be generated.

20. The non-transitory computer-readable storage medium as set forth in claim 19,
   wherein the display control causes the display to display the panoramic image in progress such that the panoramic image in progress comprises (i) a first area corresponding to the panoramic image data and (ii) a second area to be overwritten with an image corresponding to an image to be newly captured by the image capturing unit, wherein the first area increases with progression of generation of the panoramic image data and the second area decreases with progression of the generation of the panoramic image data, and
   wherein the image capture processing for generating the panoramic image data is terminated in accordance with receipt of the instruction to terminate the image capture processing, even if the second area still remains in the panoramic image in progress.

21. The non-transitory computer-readable storage medium as set forth in claim 19, wherein data of the images captured by the image capturing unit is stored in a memory, and the panoramic image data is generated from the data of the images stored in the memory.

22. The non-transitory computer-readable storage medium as set forth in claim 19, wherein the display control causes the display to display the panoramic image in progress such that the panoramic image in progress is superimposed on the live-view image.

23. The non-transitory computer-readable storage medium as set forth in claim 22, wherein the display control causes the display to separately display the panoramic image in progress and the live-view image such that the panoramic image in progress is superimposed on a part of the live-view image.

24. The non-transitory computer-readable storage medium as set forth in claim 19, wherein the display control causes the display to display the panoramic image in progress such that the panoramic image in progress is not superimposed on the live-view image.

25. The non-transitory computer-readable storage medium as set forth in claim 19, wherein the display control causes the display to display the panoramic image in progress such that the panoramic image in progress is smaller than the live-view image.

26. The non-transitory computer-readable storage medium as set forth in claim 19, wherein the image capturing unit continues to perform image capture processing for capturing images to be displayed as the live-view image and the display control continues causing the display to display the live-view image, even when the instruction to terminate the image capture processing for generating the panoramic image data is received.

27. The non-transitory computer-readable storage medium as set forth in claim 19, wherein the image capturing unit continues to perform image capture processing for capturing images to be displayed as the live-view image and the display control continues causing the display to display the live-view image, even when the image capture processing for generating the panoramic image data is terminated in accordance with receipt of the instruction to terminate the image capture processing for generating the panoramic image data.

28. An image capturing apparatus, comprising:
   image capturing means for sequentially capturing images;
   image generation means for generating panoramic image data from the images captured by the image capturing means;
   display control means for causing a display to separately and simultaneously display (i) a panoramic image in progress corresponding to the panoramic image data generated by the image generation means and (ii) a live-view image corresponding to an image that is newly captured by the image capturing means while images are being captured by the image capturing means;
   reception means for receiving an instruction to terminate image capture processing for generating the panoramic image data while the panoramic image in progress and the live-view image are being displayed; and
   recording control means for performing, in response to reception of the instruction, control to record, as a completed panoramic image, panoramic image data generated from the images captured by a time when reception of the instruction by the reception means is finished, even if images have not yet been captured in a predetermined capture range set in advance for a full panoramic image to be generated.

* * * * *